(No Model.)

W. STEPHENS.
CURRENT WHEEL.

No. 447,915. Patented Mar. 10, 1891.

Witnesses,
Geo. H. Strong

Inventor,
William Stephens
By Dewey & Co.
Attys

UNITED STATES PATENT OFFICE.

WILLIAM STEPHENS, OF SANTA ROSA, CALIFORNIA.

CURRENT-WHEEL.

SPECIFICATION forming part of Letters Patent No. 447,915, dated March 10, 1891.

Application filed March 21, 1890. Serial No. 344,806. (No model.)

*To all whom it may concern:*

Be it known that I, WILLIAM STEPHENS, a citizen of the United States, residing at Santa Rosa, Sonoma county, State of California, have invented an Improvement in Current-Wheels; and I do hereby declare the following to be a full, clear, and exact description of the same.

My invention relates to improvements in what are known as "current-wheels;" and it consists in the constructions and combinations of devices which I shall hereinafter fully describe and claim.

Figure 2:
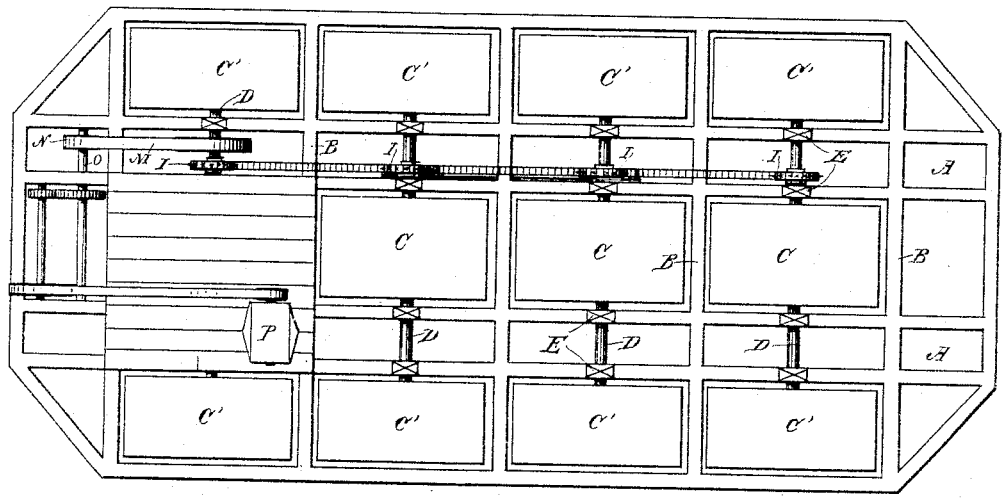
Figure 3:
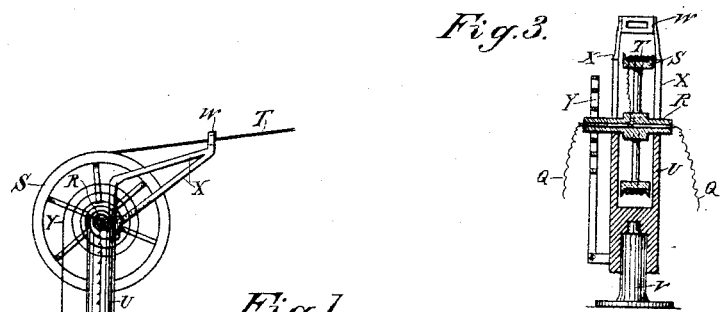
Figure 1:
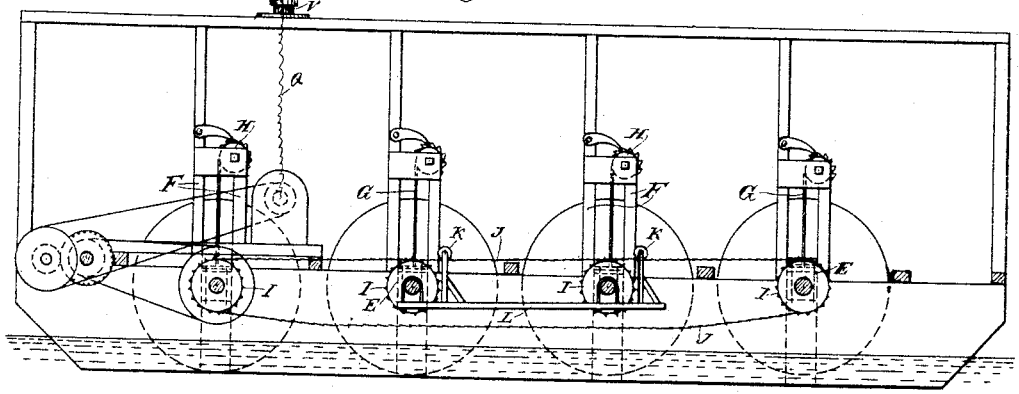

Figure 1 is a side elevation showing the relative arrangement of a series of wheels, and means for raising and lowering them and adjusting them with relation to each other. Fig. 2 is a plan view. Fig. 3 is a detail showing the mechanism for transmitting the electric current from the movable float to the shore, and a take-up mechanism for the transmitting rope, wire, or cable.

A A are a series of floats of any suitable size and construction, which may be anchored in a stream or current of water, either natural or artificial. In the present case I have shown two of these floats connected together by transverse beams or timbers B, so as to lie parallel with each other and have a space between them, within which one set of wheels C are journaled to revolve upon the shafts D. These shafts are journaled upon the floats and extend across them and beyond the outer sides of the floats, so as to receive another set of wheels C', which are also fixed to the shafts, so that there will be two or more wheels upon each shaft. The blades or floats of these wheels dip in the current of water, which, flowing rapidly past the anchored floats, will cause the wheels to revolve. Around the periphery of the floats and exterior to the outer wheels I have shown fenders or timbers fixed to the ends of the transverse frame-timbers and continued around the front of the float as well, so as to protect the wheels from driftwood or other injury. As these wheels are arranged in succession, one behind the other, the force of the current will be liable to be somewhat impeded by the first wheel, and if all the wheels were allowed to dip into the water to the same depth the wheel succeeding the first one would not be acted upon by the current as efficiently as would be desirable. In order to overcome this difficulty I have shown the shafts of the wheels journaled in boxes E, which are fitted into vertical guides F, supported from the floats. These boxes have connected with them the suspending-ropes G, which pass over suitable drums at H, and power may be applied to the shafts of these drums, so as to wind up the ropes and raise the shafts, and with them the wheels, to any desired point, where they are held by pawls and ratchets or other suitable device. By this adjustment I am enabled to place the wheels which are first acted upon by the current so that they will dip a certain depth in the water, the next succeeding wheels behind them will be allowed to dip a little deeper, and so on until the final one, which may dip deeply enough to receive the proper force of the current. Upon the shafts of each of these sets of wheels are fixed sprocket or chain wheels I, and around them a chain J passes, this chain being so constructed as to engage with the teeth of the wheels and to be driven by them. As the chain passes around the two end wheels, there will be no difficulty in keeping it in contact with them; but as it only passes over the intermediate sprocket-wheels in a tangent with their periphery I have shown a device for holding the chain in contact with the teeth of the sprocket-wheels, consisting of a roller K, journaled in a supporting-frame L, this roller being journaled upon the supporting-frame L, which is hung from the shafts to keep it in position, so as to be raised and depressed with them and to thus maintain its position relative to the chain-wheels at all times, whatever adjustment may be made. This pulley K bears upon the chain at such a point as to keep it always engaged with the teeth of the wheel, and power is thus transmitted from all the wheels through this single chain. From the shaft of the last of the wheels another chain M passes around a pulley N, fixed upon a counter-shaft O, and from this counter-shaft, by means of belts or other conducting device the power may be transmitted to drive a dynamo or other machinery, the speed being increased by multiplying pulleys or gear in any well-known manner to give any desired speed to the machinery to be driven. In the present case I have shown the power as applied to drive a dynamo, (represented at P,) and from this the electrical current is taken off by a conductor Q. This conductor may be constructed in any suitable manner. In the present case I have shown the positive and the negative wires passing from the dynamo and entering the ends of a hollow shaft R, uniting in the center and passing out through the hub of a wheel S, so as to be connected with the rim of said wheel. Around the rim of this wheel the conducting-band T is wound, making enough turns to allow the wheel to rotate somewhat upon its axis without breaking the contact, and from this wheel the conducting-belt is led away to any point where the current is to be used. This wheel is journaled in a frame U, which is mounted so as to swivel upon a vertical post V upon the platform of the floats. This allows the floats to change their position with relation to the shore connection of the conducting-belt T, and in order to maintain the belt in its proper position upon the pulley S, I have shown a guide W, through which the belt passes. This guide is supported by arms X from the frame U, which carries the wheel S, and they all swivel together about the post V, so as to maintain the proper direction of the belt. A spring Y is coiled upon the shaft of the wheel S, having sufficient tension to turn the wheel so as to wind up any slack which may take place in the conductor-belt T caused by movement of the float nearer to or farther away from the shore connection of the conducting-belt, and the spring will correspondingly relax and allow the belt to be drawn off from the pulley, when desired.

Having thus described my invention, what I claim as new, and desire to secure by Letters Patent, is—

The floats with the adjustable shafts and paddle-wheels supported upon them, sprocket-wheels and chains whereby the power generated by the wheels may be transmitted to drive a dynamo, the guide mechanism consisting of the vertical standard turning upon a swivel-post, a wheel journaled upon said standard, the conductor-belt passing around said wheel and leading from it to the shore, and a spring whereby a tension is kept upon the wheel so as to allow the conductor to wind or unwind upon it automatically, substantially as herein described.

In witness whereof I have hereunto set my hand.

WILLIAM STEPHENS.

Witnesses:
   GEO. H. STRONG,
   S. H. NOURSE.